Patented Nov. 1, 1927.

1,647,764

UNITED STATES PATENT OFFICE.

WILLIAM H. ALLEN, OF DETROIT, MICHIGAN.

PROCESS OF REGENERATING CAUSTIC-ALKALI SOLUTIONS.

No Drawing.   Application filed February 25, 1927.   Serial No. 171,084.

The present invention relates to the recovery for re-use of alkali metal caustic used in the removal of paint, enamel or lacquers from metal articles.

In the enamelling or coating of metal articles with lacquers or paints there is usually a small percentage of rejects, i. e., articles upon which the coating is imperfect, which have to be cleaned of the coating and re-finished.

The cleaning is usually accomplished by placing the articles in boiling solutions of caustic soda until the coating can be washed off. In a comparatively short time of use such solutions become so fouled with polymerized compounds of the coating material and alkali that they can no longer be used and are usually thrown away, thus adding expense to the operation.

Among the objects of the present invention is the recovery in a simple, economical, manner of this caustic alkali so that it can be used again. The solutions usually used for the above purpose have from 5 to 10% or higher caustic alkali (usually caustic soda). When such a solution has become too foul for further use, it is placed in a suitable vessel and calcium hydrate added thereto in the proportion of from 2 to 6% by volume of the foul solution. This is thoroughly mixed with the solution and heated if necessary. The mixture is then allowed to stand to permit the precipitated material to settle and the supernatant liquid is drawn off. This liquid will be found to contain most of the original caustic and can be re-used without further additions.

After the clear liquid is drawn off the settled material, the latter is washed by decantation once or twice and the wash water used to dissolve fresh caustic for fresh solution, or the first washing may be added to the clear liquid drawn off first.

Sometimes the caustic solution before regeneration will be found to contain sulfates and in such cases it is preferred to add a small amount of barium hydrate with the calcium hydrate.

Having now described the invention and the preferred manner of practising the same it is to be understood that the invention is to be limited not to the details herein set forth but only by the scope of the claims which follow.

I claim:—

1. The process of regenerating caustic alkali solutions which have become fouled in the treatment of metal articles coated with paints, enamels, lacquers and the like, which comprises mixing therewith calcium hydrate, and separating the precipitate from the mixture.

2. The process of regenerating caustic alkali solutions which have become fouled in the treatment of metal articles coated with paints, enamels, lacquers and the like, which comprises mixing therewith from 2 to 6% by volume of calcium hydrate allowing the precipitated material to settle and drawing off the supernatant liquid containing the regenerated caustic alkali.

3. The process of regenerating caustic alkali solutions which have become fouled in the treatment of metal articles coated with paints, enamels, lacquers and the like, which compries mixing therewith from 2 to 6% by volume of calcium hydrate and a small amount of barium hydrate allowing the precipitated material to settle and drawing off the supernatant liquid containing the regenerated caustic alkali.

WILLIAM H. ALLEN.